United States Patent [19]
Doby

[11] Patent Number: 5,394,957
[45] Date of Patent: Mar. 7, 1995

[54] DEER STAND

[76] Inventor: Kevin D. Doby, Rte. 3, Box 609, Thomasville, N.C. 27360

[21] Appl. No.: 173,161

[22] Filed: Dec. 27, 1993

[51] Int. Cl.⁶ .......................................... A01M 31/02
[52] U.S. Cl. ..................................... 182/187; 108/152
[58] Field of Search ................. 182/187, 188, 133–136, 182/116; 108/152

[56] References Cited

U.S. PATENT DOCUMENTS 4,475,677 10/1984 Eastridge ............................ 182/187
4,667,773 5/1987 Davis ................................... 182/187
4,924,972 5/1990 Westbrock ........................... 182/187

Primary Examiner—Alvin C. Chin-Shue

[57] ABSTRACT

A stable and comfortable deer stand is provided consisting of lightweight, hollow aluminum tubing and a padded chair. The deer stand includes a chair, a platform, and a platform support. The deer stand is attached to a tree trunk by a total of five different attachments for stability and safety. The deer stand is conveniently collapsible for storage and transportation purposes.

20 Claims, 5 Drawing Sheets

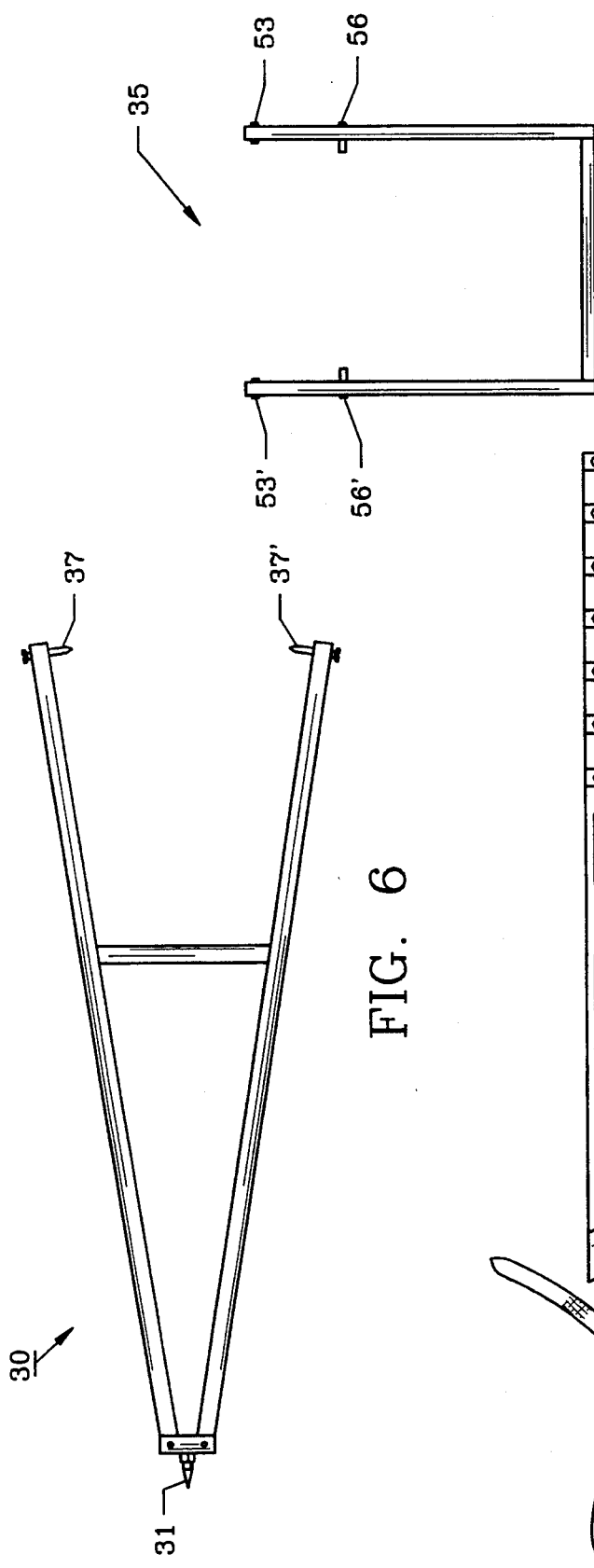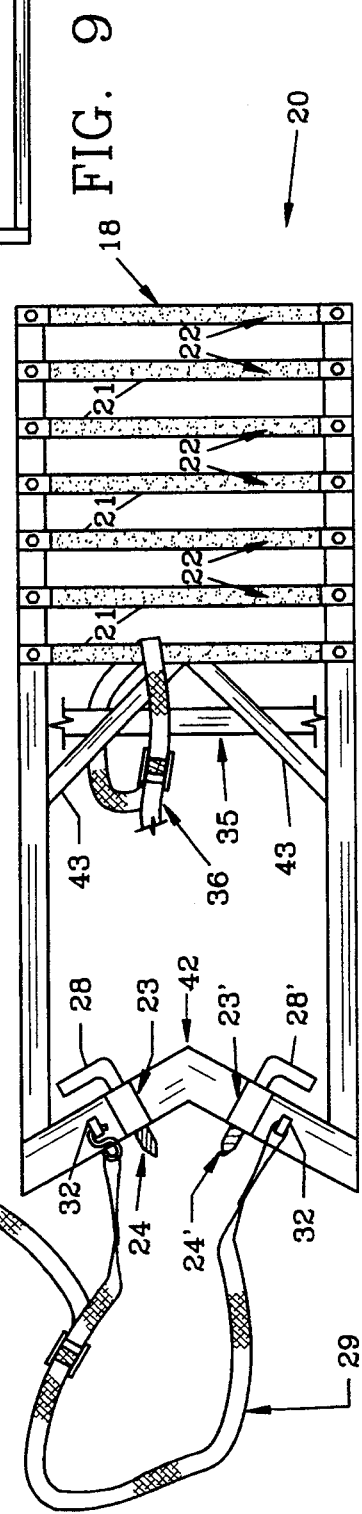

5,394,957

DEER STAND

BACKGROUND OF THE INVENTION

1. Field of the Invention

The invention herein pertains to a deer stand which is used for hunting or observing deer or other animals and particularly pertains to a deer stand for mounting on the side of a tree trunk above the ground.

2. Description of the Prior Art and Objectives of the Invention

Deer stands have become increasingly popular with hunters and photographers in recent years to aid in hunting or viewing deer or other animals. Such deer stands! are commonly mounted above the ground on the side of a tree trunk high enough to provide a good view of the surrounding area. This allows a hunter or photographer to see a deer or other animal approaching before the animal gets close enough to the person to sense and avoid him. It also provides an unobstructed view of the animal for taking a clean shot of the animal with a gun or camera.

Some conventional deer stands are notorious flimsy and dangerous due to their instability when mounted on the side of a tree. Oftentimes the purpose of providing a good stable view for a hunter is defeated when a hunter has trouble sighting a deer due to swaying or movement of a flimsy deer stand. Photographers also have difficulty in obtaining a blur-free picture of an animal if the platform on which the photographer is positioned does not remain stationary during photograph exposure. Also, many conventional deer stands are lacking in sufficient attachment points to provide stability when attached to a tree and ground-mounted deer stands often do not provide enough height to give a hunter or a photographer a good view of an animal. Many deer stands are bulky and difficult to transport to a hunting or photographing site due to the impossibility of folding them into a compact configuration. Usual deer stands are also generally uncomfortable after a hunter or photographer sits for an extended period of time. In addition, conventional deer stands often do not provide a safe place for a person to stand upon and this forces a hunter or photographer to remain seated while firing a weapon or camera.

Thus, with the problems and disadvantages of prior art deer stands, the present invention was conceived and one of its objectives is to provide a deer stand that! is both stable and comfortable when a hunter or photographer sits in it for an extended period of time.

It is yet another objective of the present invention to provide a deer stand which can be easily folded into a collapsed configuration for ease in transporting and storing.

It is also an objective of the present invention to provide a deer stand which is very secure upon mounting to a side of a tree trunk and will not move vertically or horizontally when a hunter or photographer is attempting to shoot an animal.

It is a further objective of the present invention to provide a deer stand which includes a stable surface on which a hunter or photographer may stand without fear of losing his balance and falling.

It is still yet another objective of the present invention to provide a deer stand which includes multiple attachment means for which to attach the deer stand to the side of a tree trunk.

Various other objectives and advantages of the invention will become apparent to those skilled in the art as a more detailed presentation is set forth below.

SUMMARY OF THE INVENTION

The aforesaid and other objectives are realized by providing a collapsible deer stand formed from aluminum components. A padded chair allows a hunter or photographer to sit thereon and includes unique brackets for ease in folding the chair, but yet provide strength and rigidity to the chair when occupied. The chair back support, back legs, and seat support are all pivotally attached to the brackets. The chair is pivotally attached to a substantially rectangular platform by the back legs of the chair. The front leg of the chair is a one-piece U-shaped member which extends below the platform and is supported against the bottom of the platform by an adjustable strap and allows easy folding of the chair. The front of the platform provides a stable footrest for a hunter or photographer and insures good traction upon standing by having a friction producing surface. A V-shaped platform support is attached pivotally beneath the front of the platform for attachment to the tree trunk. The deer stand is stably attached to the side of a tree trunk by straps which wrap around the tree trunk, by a spike and prongs which bite into the tree trunk, and by threaded members for screwing into the tree trunk.

BRIEF DESCRIPTION OF THE DRAWINGS

FIG. 5 pictures a top view of the platform of the deer stand with the chair and platform support removed but with straps attached;

FIG. 6 illustrates a top view of the V-shaped platform support with hinges at the top of the V and a spike at the bottom as removed from the stand;

FIG. 9 demonstrates an elevational front view of the U-shaped front leg of the chair as removed! from the chair.

DESCRIPTION OF THE PREFERRED EMBODIMENT

Figure 1:
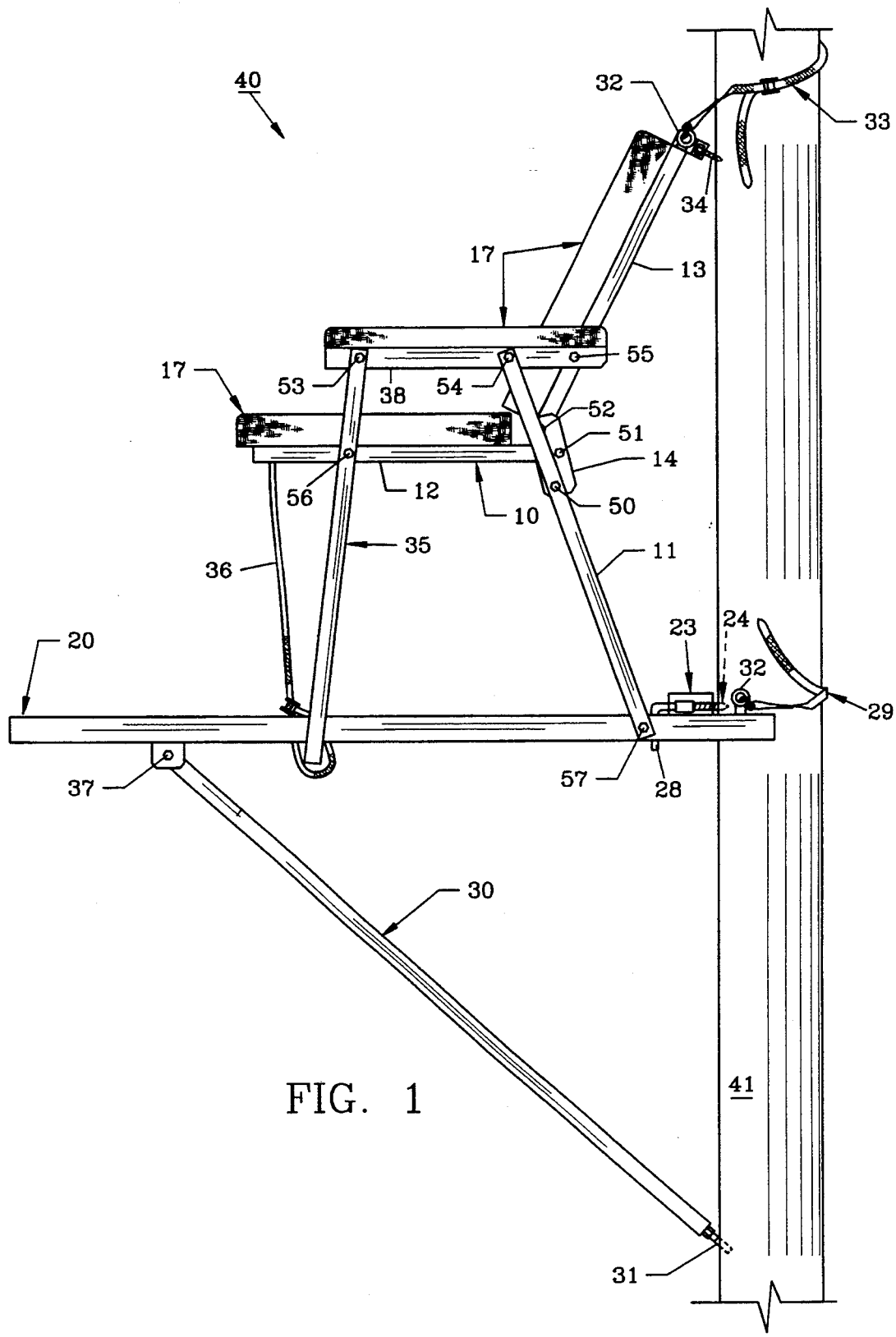
FIG. 1 illustrates a left side elevational view of a collapsible deer stand attached to a tree trunk and showing the different means of attaching the stand.
Figure 2:
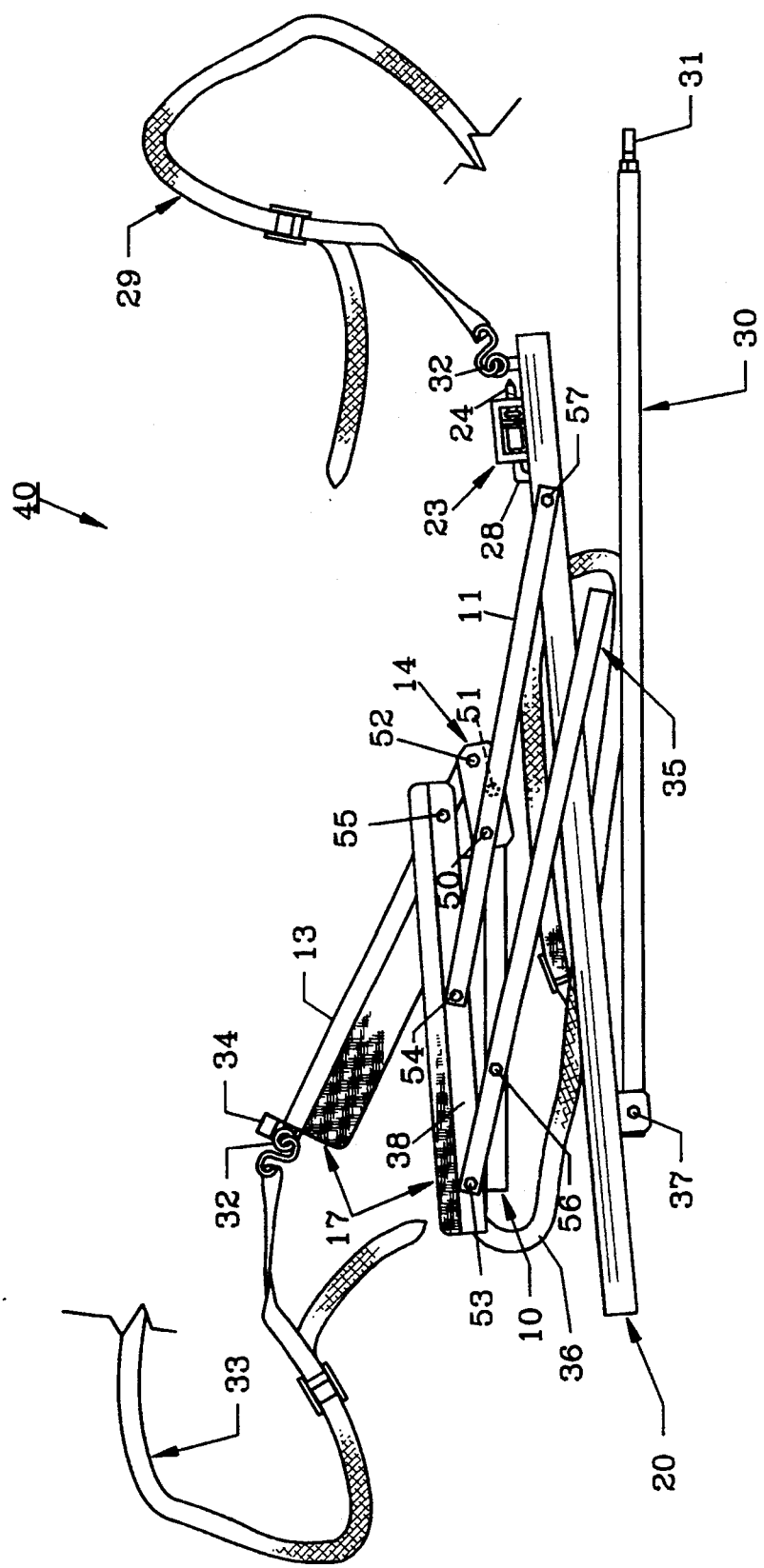
FIG. 2 shows the deer stand as illustrated in FIG. 1 in a collapsed configuration.
Figure 7:
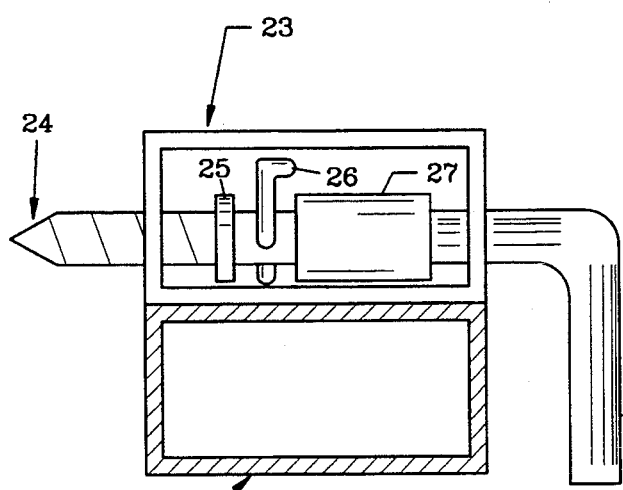
FIG. 7 presents a close-up side view of a threaded member as attached to the rear of the platform.
Figure 8:
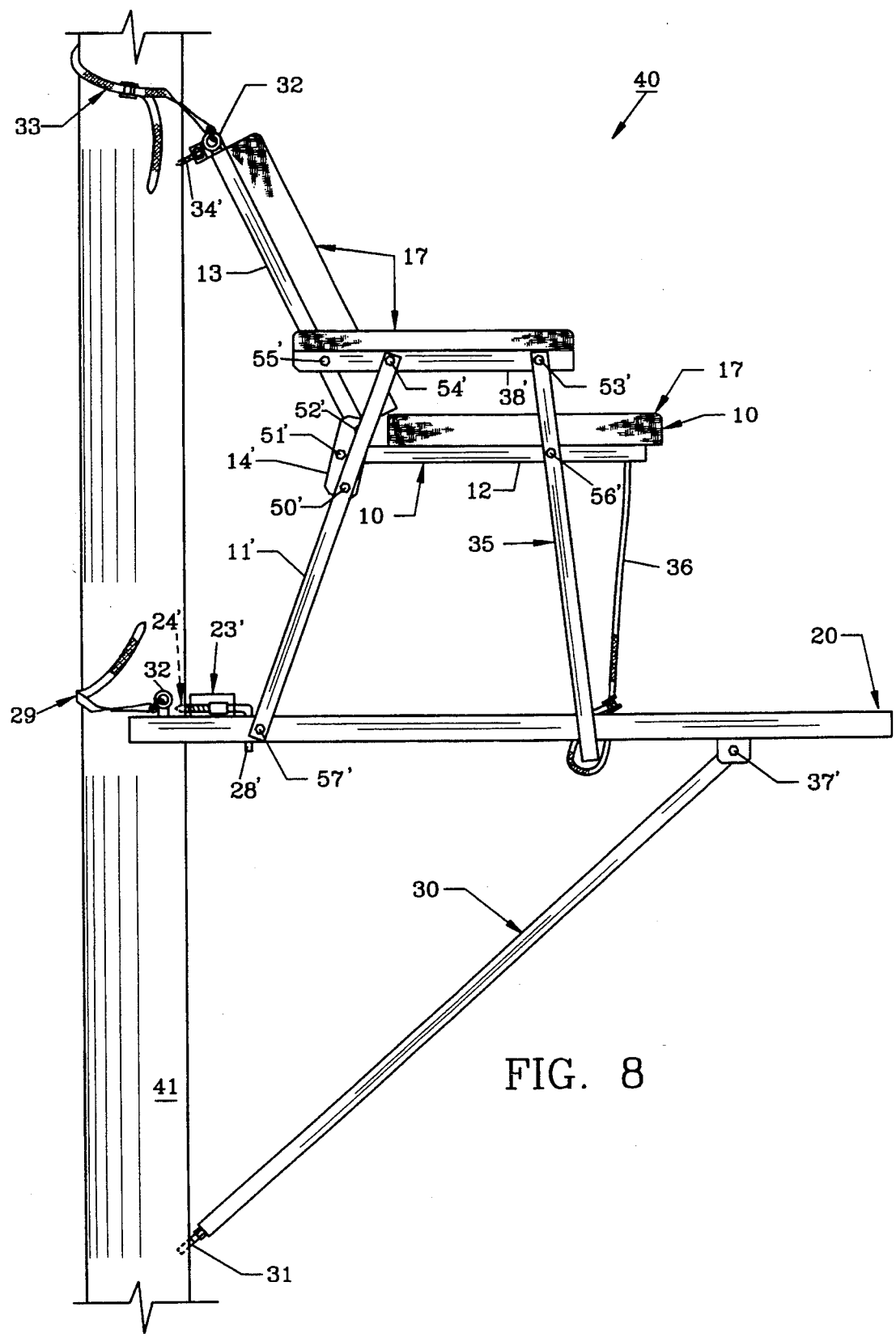
FIG. 8 shows a right side elevational view of the deer stand as shown in FIG. 1.

The preferred form of the invention is shown in FIGS. 1–9 whereby a deer stand is formed predominantly from square aluminum tubing held together with weldments and bolts. The exterior of the aluminum has an enamel or similar durable finish and the chair of the deer stand is padded for comfort with a footrest having a frictional surface for traction and safety. As shown in FIGS. 1 and 8, the deer stand attaches to the side of a tree trunk at three general positions, (1) the top of the chair back, (2) the rear of the platform, and (3) the bottom of the platform support. At the top of the chair back, an adjustable one inch wide nylon strap, which is attached to the top of the chair back by eye bolts, pulls the chair into contact with the tree trunk and forces two sharpened aluminum prongs, which are welded atop the chair back, into the side of the tree trunk. At the rear of the platform, another one inch wide adjustable strap, which is attached by eye bolts to the concave rear section of the platform, urges the rear of the platform into tight contact with the tree trunk and two steel threaded members, also illustrated in FIGS. 5 and 7, which are welded to the concave rear section of the platform next to the strap eye bolts, screw into the side of the tree trunk for increased horizontal stability. At the bottom of the V-shaped platform support, a sharpened steel spike, also shown in FIG. 6, bites into the tree trunk to prevent the deer stand from sagging when loaded. FIGS. 1 and 8 illustrate the rear chair legs pivotally attached near the rear of the platform whereas the front (second) chair leg, which, as shown in FIG. 9, is a single U-shaped member, extends beneath the platform and is held against the bottom of the platform by a third one inch wide adjustable strap as also shown in FIG. 5. This configuration aids in collapsing the chair, as FIG. 2 illustrates, and in addition, i provides some resiliency to the chair for additional comfort for the user. As can been seen in FIGS. 3 and 4, a chair bracket contains pivotal attachment points for a rear chair leg, the seat support and the back support members. These three members are each pivotally attached to the bracket at a different point. The three different pivot points form an obtuse isosceles triangle, the vertex of the obtuse angle being the pivot point of the seat support. This configuration also provides strength to the structure and makes collapsing of the structure, shown in FIG. 2, easy and convenient. The front of the platform has seven horizontal bars which compose the aforementioned footrest whereupon a hunter or photographer can safely stand. FIG. 6 illustrates the V-shape of the platform support with hinges at the top for attachment to the underside of the platform, as shown in FIGS. 1 and 8, and the aforementioned spike at the distal end. The entire stand is kept to a weight of approximately twenty-five pounds for ease in transporting and mounting by its lightweight aluminum composition. Most of the hollow aluminum tubing is one inch square with a 1/8" thick wall, except for the concave rear section of the platform, which is a hollow aluminum piece 2½" by 1¼" in size. The preferred size of the platform is 46" long, 18" wide and 1⅜" high. The V-shaped platform support is 48" long, 18" wide at the top, and 1" high. The chair seat and back are each approximately 18" square and the top of the chair back is approximately 30" above the platform. Each chair leg is approximately 26" long from armrest to platform.

DETAILED DESCRIPTION OF THE DRAWINGS AND OPERATION OF THE INVENTION

For a better understanding of the invention, turning now to the drawings, FIGS. 1 and 8 illustrate left and right views, respectively, of deer stand 40 as attached to tree trunk 41. Deer stand 40 comprises chair 10, platform 20, and platform support 30. Chair 10 includes first rear legs 11, 11' seat support 12, back support 13, and armrests 38, 38'. Chair 10 is pivotally attached to platform 20 at pivot points 57 and 57'. At the top of back support 18 are located first adjustable strap 33, attached by eyebolts 32, and prongs 34 and 34' for firm engagement with tree trunk 41. Cushions 17 are placed atop seat support 12, armrests 38, 38', and back support 13 for comfort of the user. Chair 10 also comprises front (second) leg 35 and third adjustable strap 36 located at the front of chair 10. Seat support 12, left rear leg 11 and back support 13 are all pivotally attached to left bracket 14 at pivot points 51, 50, 52, respectively, as shown in FIG. 1. FIG. 8 shows seat support 12, right rear leg 11' and back support 13 pivotally attached to right bracket 14' at pivot points 51', 50', 52' respectively. Front leg 35 is pivotally attached to seat support 12 at pivot points 56 and 56' and to armrests 38, 38' at pivot points 53, 53' and extends below platform 20. Armrests 38, 38' are also pivotally attached to back support 13 at pivot points 55, 55' respectively and to rear legs 11, 11' at pivot points 54, 54' respectively. Third strap 36 is attached to the underside of the front of chair 10 and extends downwardly around the bottom of U-shaped front leg 35 and through platform 20 to hold chair 10 upright by pulling front leg 35 against the bottom of platform 20. FIGS. 1 and 8 also show platform support hinges 37, 37' where platform support 30 pivotally joins the bottom of platform 20. Spike 31 is affixed to the distal end of platform support 30 for engagement with tree trunk 41. At the rear of platform 20 is located second strap 29, attached by eyebolts 32, which is also adjustable for firm engagement with tree trunk 41. In addition, support is provided by threaded members 24, 24' which are enclosed in housing members 23, 23' and tightened into tree trunk 41 by turning handles 28, 28' respectively. Housing members 23, 23' are attached to rear of platform 20 by welding or the like.

Deer stand 40 is seen in FIG. 2 in its collapsed state from a left side view. As can be seen, bracket 14 rotates on collapsing of deer stand 40 into a substantially horizontal position, whereas in FIG. 1, bracket 14 was in a substantially vertical position. FIG. 2 also illustrates the folding of front (second) leg 35 against the bottom of platform 20 when third strap 36 is loosened.

Figure 3:
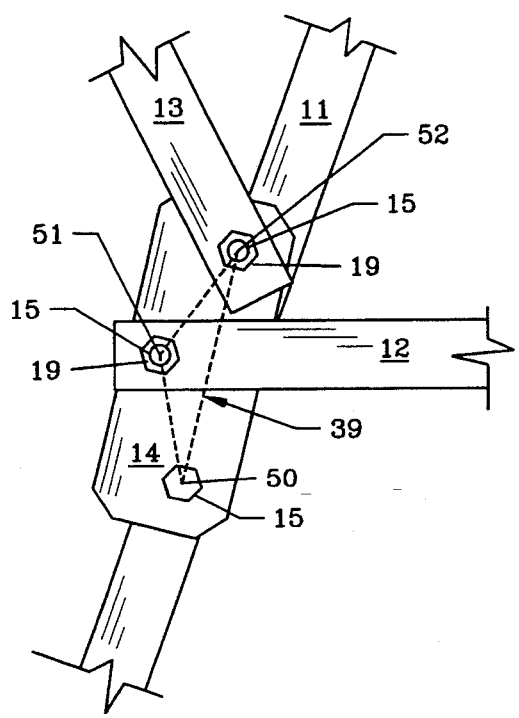
FIG. 3 demonstrates a close-up inside view of the left bracket of the chair from the inside of the chair and the attachment points of various members of the chair.

A close-up view of left bracket 14 is seen from the inside of chair 10 in FIG. 3 wherein left rear (first) leg 11, seat support 12, and back support 13 all are attached by bolts 15 at different pivot points 50, 51, 52 respectively to bracket 14. Nuts 19 can be seen on bolts 15 at the pivot points of seat support 12 and back support 13. The pivot points of rear leg 11, seat support 12 and back support 13 form an obtuse isosceles triangle on bracket 14 as illustrated by dashed line 39. Pivot point 51 of seat support 12 is located at the vertex of the obtuse angle of obtuse isosceles triangle 39. The distance between pivot points 51, 52 is equal to the distance between pivot points 50 and 51 such that the acute angles of obtuse isosceles triangle 39 are equiangular.

Figure 4:
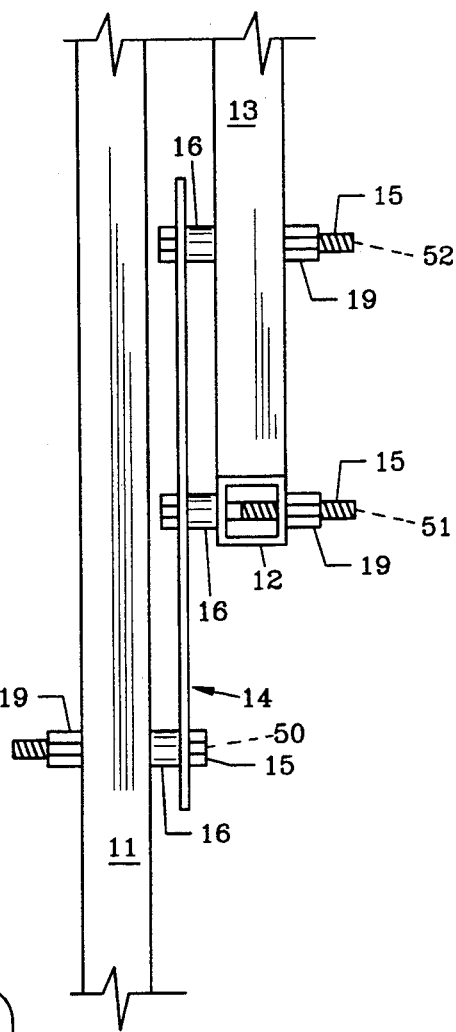
FIG. 4 depicts a rear view of the left bracket as shown in FIG. 3.

A rear view in FIG. 4 of left bracket 14 shows left rear (first) leg 11 attached to bracket 14 from the left side but with seat support 12 and back support 13 attached to bracket 14 from the right side. Rear leg 11, seat support 12 and back support 13 are attached to bracket 14 with bolts 15 and nuts 19. Spacers 16 are inserted between bracket 14 and support members 11, 12 and 13 to provide clearance when chair 10 is collapsed or extended. FIG. 4 also illustrates the alignment of back support 13 in relation to seat support 12 and the hollow, square tubular shape of the aluminum members of which deer stand 40 is constructed as seen by the end of seat support 12.

FIG. 5 shows platform 20 and its substantially rectangular shape, as removed from deer stand 40. At the front of platform 20, footrest 18 is composed of horizontal bars 21, which are covered with conventional friction producing material 22 for safety and traction. In the middle of platform 20, third strap 36 is shown encircling rear-most footrest bar 21 and U-shaped front (second) leg 35 (as shown in cut-away view), which is located below platform 20. Diagonal platform bars 43 provide structural integrity to platform 20 and prevent third strap 36 from slipping sideways. At the rear of platform 20, second adjustable strap 29 is shown affixed by eyebolts 32 to concave rear section 42 of platform 20 next to threaded members 24, 24'. Threaded members 24, 24' are enclosed in box-shaped housings 23, 23' and are turned by handles 28, 28'. Box-shaped housings 23, 23' are affixed atop concave rear section 42 of platform 20.

FIG. 6 shows a top view of V-shaped platform support 30, as removed from deer stand 40. Platform support hinges 37, 37' are illustrated at the open end of V-shaped platform support 30 and spike 31 is shown at the distal end of V-shaped platform support 30.

In FIG. 7 a side view of threaded member 24 is seen atop cross section of concave rear section 42 of platform 20. Box-shaped housing 23 is shown welded atop concave rear section 42. Threaded member 24, washer 25, cotter pin 26, and sleeve 27 are enclosed within box-shaped housing 23 to prevent removal of threaded member 24 from box-shaped housing 23. L-shaped handle 28, attached to threaded member 24, is used to manually rotate threaded member 24 into tree trunk 41.

An elevational front View of front (second) chair leg 35, as removed from deer stand 40, is shown in FIG. 9. The U-shape of front chair leg 35 can be clearly seen in this figure as can front leg/armrest pivot points 53, 53' and front leg/seat support pivot points 56, 56'.

The illustrations and examples provided herein are for explanatory purposes and are not intended to limit the scope of the appended claims.

I claim:

1. A collapsible chair assembly for attachment to a tree trunk comprising:
   (a) a platform;
   (b) a chair pivotally affixed to said platform, said chair comprising a first leg and a seat support, said first leg and said seat support pivotally joined to a bracket, said chair also comprising a U-shaped second leg pivotally joined to said chair and extending beneath said platform; and
   (c) a platform support pivotally affixed to said platform.

2. The collapsible chair assembly as claimed in claim 1 wherein said platform support is V-shaped.

3. The collapsible chair assembly as claimed in claim 2 and including a spike, said spike joined to said V-shaped platform support.

4. The collapsible chair assembly as claimed in claim 1 wherein said platform is substantially rectangularly shaped.

5. The collapsible chair assembly as claimed in claim 1 wherein said first leg and said seat support are separately joined to said bracket.

6. The collapsible chair assembly as claimed in claim 1 and including an armrest, said armrest pivotally joined to said first leg.

7. The collapsible chair assembly as claimed in claim 1 said chair comprising a back support, said back support pivotally joined to said bracket.

8. The collapsible chair assembly as claimed in claim 7 and including a means to secure said back support to said tree trunk, said back support securing means comprising a first strap and a prong.

9. The collapsible chair assembly as claimed in claim 1 and including a means to secure is said platform to said tree trunk, said platform securing means comprising a threaded member.

10. The collapsible chair assembly as claimed in claim 1 and including means to secure said platform to said tree trunk, said platform securing means comprising a strap.

11. A collapsible chair assembly for attachment to a tree trunk, above the ground, comprising:
    (a) a chair, said chair comprising: a first leg, a seat support, a back support and a bracket, said first leg, said seat support, and said back support each pivotally attached at a different pivot point to said bracket;
    (b) a platform, said chair pivotally attached to said platform;
    (c) a platform support pivotally attached to said platform; and
    (d) means to secure said chair assembly to said tree trunk.

12. The collapsible chair assembly as claimed in claim 11 wherein said securing means comprises:
    (a) a first strap attached to said back support;
    (b) a prong joined to said back support;
    (c) a second strap attached to said platform;
    (d) a threaded member attached to said platform; and
    (e) a spike attached to said platform support.

13. The collapsible chair assembly as claimed in claim 11 wherein said first leg pivot point, said seat support pivot point and said back support pivot point form an obtuse isosceles triangle on said bracket.

14. The collapsible chair assembly as claimed in claim 13 wherein said seat support pivot point is located at the vertex of the obtuse angle of said obtuse isosceles triangle.

15. The collapsible chair assembly as claimed in claim 11 and including a footrest.

16. The collapsible chair assembly as claimed in claim 15 wherein said footrest is covered with a frictional material.

17. The collapsible chair assembly as claimed in claim 11 and including a U-shaped second leg, said second leg attached to said seat support and extending below said platform.

18. The collapsible chair assembly as claimed in claim 17 and including a strap, said strap connecting said second leg to said platform to support said chair in an upright position.

19. A collapsible deer stand for attachment to a tree trunk, comprising:
    (a) a chair having a first leg, a seat support, and a back support, said first leg, said seat support, and said back support each pivotally attached to a bracket;
    (b) a platform, said chair pivotally attached to said platform;
    (c) a platform support pivotally attached to said platform; and
    (d) means for securing said deer stand to the tree trunk, said means comprising a threaded member attached to said platform, said threaded member including a washer, a sleeve, a cotter pin, and a handle.

20. The collapsible deer stand as claimed in claim 19, further comprising a box-shaped housing affixed to a rear section of said platform, said threaded member mounted in said box-shaped housing.

* * * * *